(12) United States Patent
Lloyd et al.

(10) Patent No.: US 8,274,258 B2
(45) Date of Patent: Sep. 25, 2012

(54) PORTABLE CHARGING APPARATUS

(76) Inventors: Matthew Lloyd, Bristol (GB); Richard Cuthbert, Bristol (GB)

( * ) Notice: Subject to any disclaimer, the term of this patent is extended or adjusted under 35 U.S.C. 154(b) by 443 days.

(21) Appl. No.: 12/598,330

(22) Filed: Oct. 30, 2009

(65) Prior Publication Data

US 2011/0062911 A1    Mar. 17, 2011

(30) Foreign Application Priority Data

Sep. 11, 2009  (GB) .................................. 0915972.4

(51) Int. Cl.
*H02J 7/00*  (2006.01)
(52) U.S. Cl. ......................................................... 320/115
(58) Field of Classification Search .................. 320/101, 320/107, 115; 362/249.02
See application file for complete search history.

(56) References Cited

U.S. PATENT DOCUMENTS

| | | |
|---|---|---|
| 4,605,993 A | 8/1986 | Zelina, Jr. |
| 5,010,454 A | 4/1991 | Hopper |
| 5,754,124 A | 5/1998 | Daggett et al. |
| 6,479,965 B2 | 11/2002 | Barbeau et al. |
| 6,599,001 B2 | 7/2003 | Johnson |
| 6,819,080 B2 | 11/2004 | Barbeau et al. |
| 6,911,917 B2 | 6/2005 | Higgs |
| D567,993 S * | 4/2008 | Shiu .............................. D26/102 |
| 7,391,182 B2 | 6/2008 | Barbeau et al. |
| 7,400,112 B2 | 7/2008 | Barbeau et al. |
| 7,410,269 B2 | 8/2008 | Harrity et al. |
| 7,520,800 B2 | 8/2009 | Tu et al. |
| 7,573,229 B2 * | 8/2009 | Arakelian ..................... 320/107 |
| RE41,628 E | 9/2010 | Barbeau et al. |
| 2008/0252251 A1 * | 10/2008 | Joasil ............................. 320/101 |
| 2009/0021214 A1 | 1/2009 | Foster et al. |

FOREIGN PATENT DOCUMENTS

| | | |
|---|---|---|
| WO | WO 2008/124932 A1 | 10/2008 |
| WO | WO 2009/059638 A1 | 3/2009 |
| WO | WO 2009/051833 A1 | 4/2009 |
| WO | 2009/059638 A1 | 5/2009 |

OTHER PUBLICATIONS

Appln. No. GB0915972.4, Great Britain Search Report dated Jan. 12, 2010, 3 pages.
LED Multi-functional exchibit case for bulb light 12V DC 100-240V AC products, by LE . . . , www.alibaba.com, Jan. 5, 2011, 2 pages.
Chargers, charging cases, and charging cabinets for receivers and wireless transmitters, www.barinas.com, Jan. 5, 2011, 4 pages.
Multiple Charge Instructions, Multiple Charger Case, Model CHG 1269A, Williams Sound Corp., 2005, 2 pages.
Hand Held Transmitter, Belt Pack Transmitter/Receiver, Charging Flight Case, Optional Rechargers, Hand Held Accessories, ClockAudio, pp. 101-102, date: unknown.
LED Luminaires, Industrial and Hazardous Areas, www.crouse-hinds.com, Cooper Crouse-Hinds, pp. 869 & 886, 2010.

(Continued)

*Primary Examiner* — Richard V Muralidar
(74) *Attorney, Agent, or Firm* — Crose Law LLC; Bradley D. Crose

(57) ABSTRACT

A portable charging apparatus for electrically charging one or more portable battery operated light units, comprising a container having one or more receiving means for receiving one or more portable battery operated light units, electricity supply connection means for electrically connecting with the one or more portable battery operated light units, and electricity supply regulating means.

15 Claims, 3 Drawing Sheets

OTHER PUBLICATIONS

Solar Battery Charging System (SBCS), Jan. 11, 2007, US Dept. of Defense, Humanitarian Demining Research and Development Program, 3 pages.
Enforce Logic, Police Equipment Security Kit, www.enforce-logic.co.uk, 4 pages, Sep. 12, 2010.
K&H Industries Announces New RayMax Battery-Operated Fluorescent Scene Light, 1 page, Jan. 30, 2009.
Lightforce Australia Pty Ltd., Light Force Performance Lighting, Product: BCAUZ, BCVDE, BCBS, Instruction Data, Jan. 2007, 1 page.
Lightforce Australia Pty Ltd., Light Force Performance Lighting, Product: BC12 Charger, Instruction Data, Jan. 2007, 1 page.
Mica Elektro Oy Ltd, Finland, Mica CR-C3 Charger Technical Data, Feb. 2007, 1 page.
Polimil Factory Shop, www.polimil.co.uk, Nightsearcher—Rechargeable LED Floodlight, Sep. 12, 2010, 5 pages.
RayMax Battery Operated Floodlights, K&H, 1 page, date: unknown.
The Samalite HD200 Accessory Range, Samalite HD211 Storage/Charging Case, SP Services, www.spservices.co.uk, Sep. 12, 2010, 1 page.
Equipment Accessory Kit, 1 page, date: unknown.
UK Examination Report dated Jun. 1, 2011.

* cited by examiner

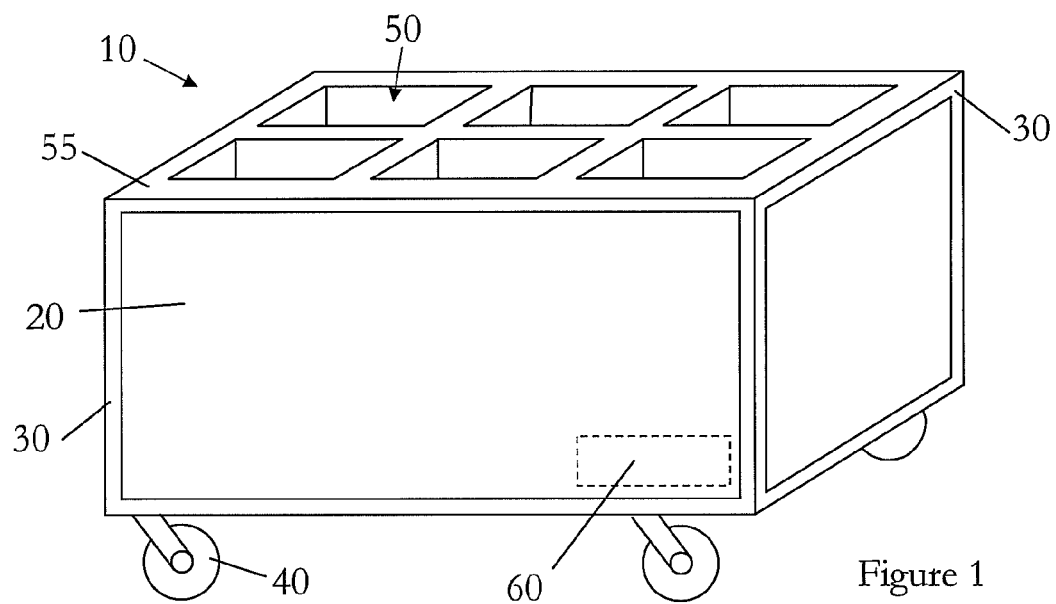
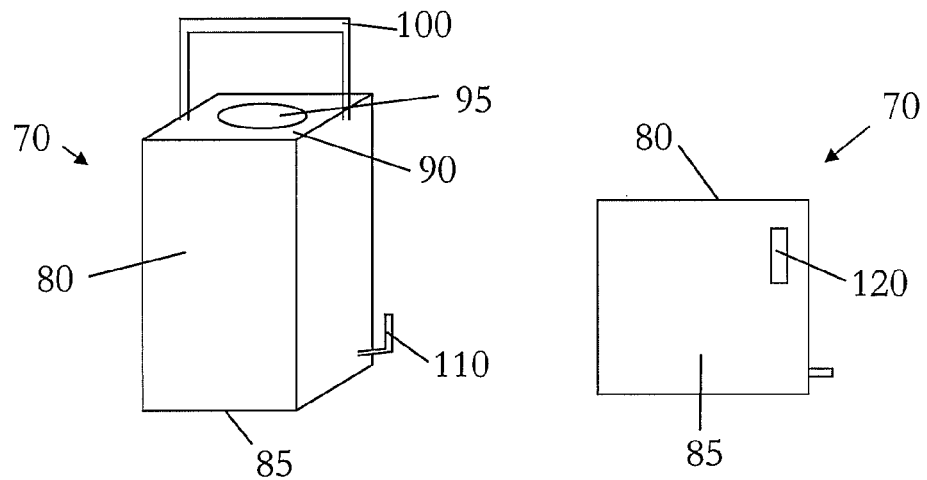
Figure 1
Figure 2
Figure 3

PORTABLE CHARGING APPARATUS

CROSS REFERENCE TO RELATED APPLICATION

This application is related to, and claims priority from, United Kingdom Patent Application Serial No. GB0915972.4, filed Sep. 11, 2009, the entire contents of which is incorporated herein by reference.

FIGURE SELECTED FOR PUBLICATION

FIG. 1

BACKGROUND OF THE INVENTION

1. Field of the Invention

The present invention relates to a portable charging apparatus for electrically charging one or more portable, battery operated, light units. More specifically, the present invention relates to a combination of a portable charging apparatus and one or more portable battery operated light units; and, a method of charging a portable battery operated light unit.

2. Description of the Related Art

The related art involves portable, battery operated, light units which are used in the events and stage industry for providing lighting. Their great advantage is that they are battery operated and thus require no trailing cables. This allows for fast installation and removal, eliminates the risk of trip hazards due to the cables, and eliminates the need to route cables to and from the power supply to the light unit.

However, the batteries in such lights require recharging. This has been achieved in the past by removing the battery from each light unit and replacing it with another fully charged battery. The discharged battery is then recharged by to connecting it to a recharging device. What is not appreciated by the prior art is that this is time consuming, laborious and requires a stock of spare batteries.

Accordingly, there is a need for an improved method and equipment for the re-charging of portable battery operated light units.

OBJECTS AND SUMMARY OF THE INVENTION

In a first aspect of the present invention, there is provided a portable charging apparatus for electrically charging one or more portable, battery operated, light units, comprising: a container having one or more receiving means for receiving one or more removable and portable battery operated light units; electricity supply connection means for electrically connecting with the one or more removable and portable battery operated light units; and, electricity supply regulating means.

The term "portable" is used herein to mean that the apparatus may be moved from one location to another relatively easily, and excludes permanent and semi-permanent installations. The term "removable" means the units may be removed from the charging apparatus when required to be used as light units.

The container itself may be reinforced in that it is substantially robust, comprising materials substantially not susceptible to damage by moisture, and/or shock, and/or unexpected collision. The reinforcing may be comprised at least around the edges and/or corners of the container. In one embodiment, the container is a flight case. The container may include wheels and/or skids on its base to enable it to be moved relatively easily.

The receiving means may include impact absorbent material such as foam, polystyrene, or plastics. This material may be formed into sockets for receiving the light units such that the units cannot move easily within their individual socket. The material may be arranged around the sides, and/or the base, and/or the top of the light units. The container may include impact absorbent material to cover the top of the light units when in place within the receiving means. The sockets may be shaped to accommodate the light units in/with a close fit. This impact absorbent material could be described as shock-resistant material and is for protecting the light units from damage due to impacts, and the like, during storage within the apparatus.

The electricity supply regulating means may include a rectifier, and/or an inverter, for converting the incoming electricity supply from AC to DC in the case of the former, or from DC to AC in the case of the latter. It may also regulate one or more of the voltage, current and frequency of the supplied electricity. It may include a transformer. This regulating means may be arranged within the container.

The electricity supply regulating means may be operable to supply electricity to the one or more portable battery operated light units at an appropriate voltage and current necessary for the recharging of the one or more portable battery operated light units. This may be 14 volts DC; however, other voltages and current types are contemplated.

The electricity supply connection means may be provided towards the base of each receiving means such that, in use, the electricity supply connection means is automatically electrically connectable to a portable battery operated light unit when inserted into said receiving means. This automatic connection may be provided by standard sprung contacts or other well understood means in which two items may be electrically connected by physical contact. It follows that the electricity supply connection means is automatically electrically disconnectable from the portable battery operated light unit when it is removed from the receiving means.

In one embodiment, the electrical supply connection means does not supply electricity by physical contact with the light unit. Rather, it is possible that the apparatus comprises inductance means for inducing an electrical current in the light unit for charging of the battery.

The apparatus may be connected to a supply of electricity such as the main supply in a building, or from a gasoline/petrol/diesel generator. This electricity supply may be provided at approximately 220 volts or 110 volts. However, it is also possible that the apparatus includes its own electricity generating means. This could be a gasoline/petrol or diesel generator. Alternatively, it could be a means for generating electricity from renewable energy such as a wind turbine or solar panel. The ability to operate the apparatus, without the need for connection to a main supply of electricity, allows for a cableless system.

The wind turbine may be capable of being disassembled such that it can fit within the container. In the case of solar panels, the panels may be storable within the container for erection as required. This may be due to the possibility of folding and/or disassembling the frames. When assembled and/or erected, and/or unfolded, the frames and/or panels may be positioned as required relative to the sun. The frames may be positioned remotely from the container but electrically connected thereto. Alternatively, or additionally, the container may include a lid comprising the solar panels. The lid may be hingably connected to the container such that, in use, the lid may be opened to the required angle and pointed at the sun. Alternatively, or additionally, the lid may be removable from the container and positioned remotely from the container but electrically connected thereto.

The electricity regulating means is operable to convert the electricity supplied to a form which is required to recharge the light units. In the case of a solar panel supplying electricity, the invention may provide enough electricity on a relatively bright day in the UK to recharge six light units in 8 hours. The solar panel may produce electricity at 24 volts DC.

In a second aspect, the invention provides a portable charging apparatus, as described and/or claimed herein, in combination with one or more portable battery operated light unit.

The one or more portable battery operated light units may have an LED light source. The one or more portable battery operated light units may be an uplighter in that the light unit is able to direct light substantially upwards in its typical and usual orientation.

The one or more portable battery operated light units may include electricity receiving connection means. These may be the contacts discussed above for connection with the electricity supply connection means provided in the apparatus.

The electricity receiving connection means may be provided on the base of each portable battery operated light unit such that, in use, when a light unit is lowered into the receiving means in the correct orientation it is automatically and immediately electrically connected to the apparatus. Means for allowing the light units to be inserted into the sockets in only one correct orientation may be provided. On removal from the receiving means, the electrical connection may be broken.

The portable light units may be controllable wirelessly and may use a standard communication protocol such as DMX. The light units may include an aerial to allow for this remote communication/control.

In a third aspect, the invention provides a method of charging a portable battery operated light unit comprising the steps of providing a portable charging apparatus for electrically charging one or more portable battery operated light units, the portable charging apparatus comprising a container having one or more receiving means for receiving one or more removable and portable battery operated light units, electricity supply connection means for electrically connecting with the one or more removable and portable battery operated light units, and electricity supply regulating means; and inserting a portable battery operated light unit into said receiving means such that it electrically connects with said portable charging apparatus.

The method of the present invention may include the step of arranging the electricity generating means to supply electricity to the portable charging apparatus. This may mean the erection of a solar panel or wind turbine, or the connection of the apparatus to a gasoline/petrol/diesel generator or main electricity supply. In this regard, the portable charging apparatus may include an electricity generating means such as a wind turbine and/or solar panel.

The method may include the step of regulating the electricity supply to allow for the recharging of the one or more light units. The supply may be regulated to have appropriate characteristics.

The apparatus may hold any number of light units; but, it is expected to be within the group of one, two, four, six, eight or ten. The apparatus provides a container which securely holds the light units during transport. The apparatus allows the batteries with each light unit to be charged without the need to remove the batteries from the units and without the need to remove the units from the container. When required, the light units may be removed by lifting out of the container and sited as desired. They can be operated remotely. When the battery in the light unit has discharged, or the light unit is no longer required, it may be inserted into the container for storage and/or recharging and/or transport. Accordingly, the invention provides a simple and easy system for the supply of portable light units for events such as theatres, film studios, stages and the like. Due to the possibility of an independent power supply, such as solar panels, the apparatus allows for the supply and charging of the light units at outdoor events where a power supply may be difficult or undesirable to provide.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

The above, and other objects, features and advantages of the present invention will become apparent from the following description read in conduction with the accompanying drawings, in which like reference numerals designate the same elements.

BRIEF DESCRIPTION OF THE DRAWINGS

FIG. 1 is a perspective view of one embodiment of the portable charging apparatus;

FIG. 2 is a perspective view of one embodiment of a portable battery operated light unit;

FIG. 3 is a plan view of the underside of the light unit of FIG. 2;

DETAILED DESCRIPTION OF THE PREFERRED EMBODIMENTS

Figure 4:
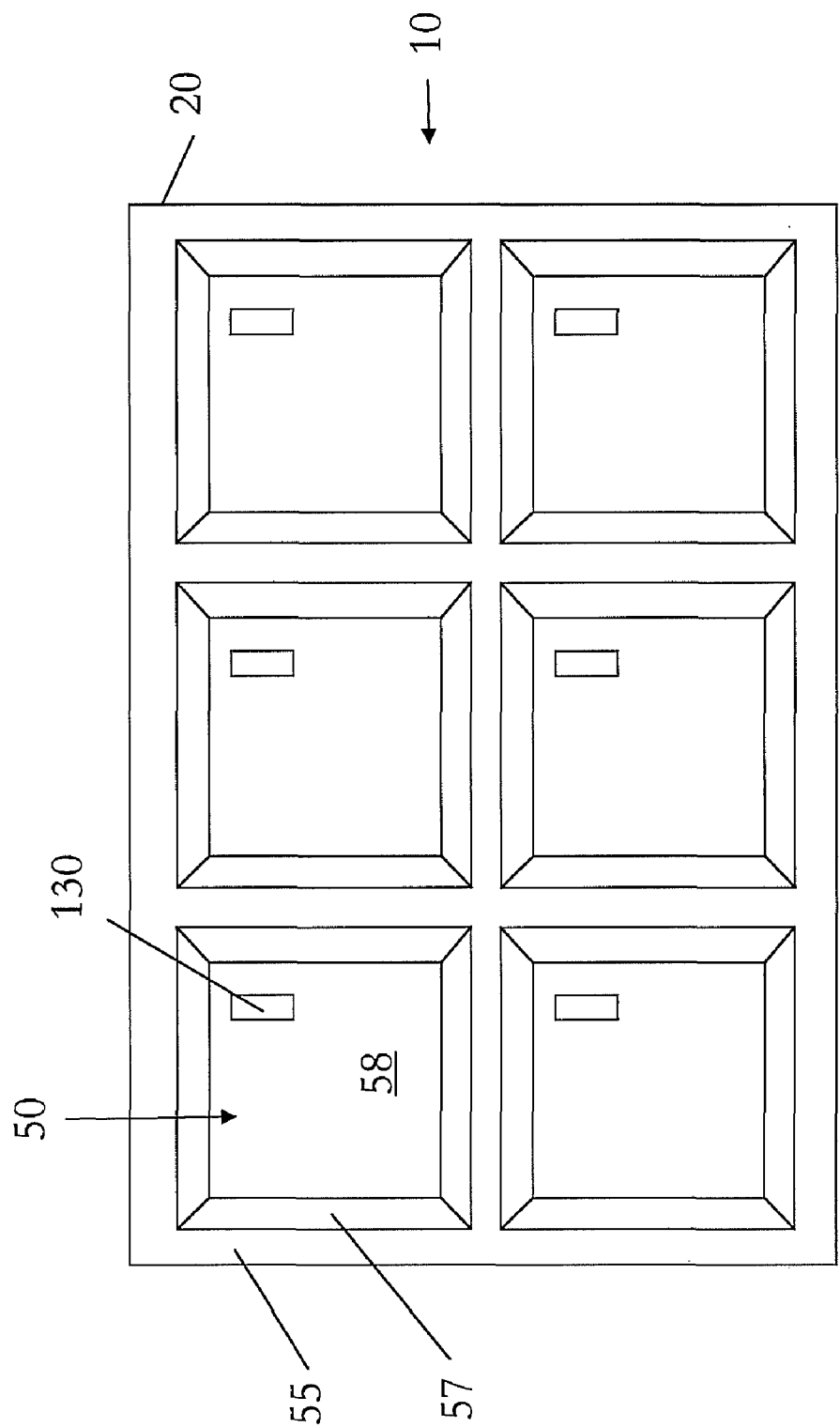
FIG. 4 is a plan view of the portable charging apparatus of FIG. 1.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may refer to different embodiments. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

The portable charging apparatus 10, as is shown in FIG. 1, comprises a container 20 which is substantially box shape with rectangular sides. The edges of the container 20 are reinforced with reinforcing strips 30. The container 20 includes wheels 40 on its underside for ease of movement.

The container 20 is closed on all five sides (bottom and four sides) but is open at the top side. A lid may be included (not shown). The lid may be removably connected to the container 20 and may be hinged thereto.

The inside of the container comprises anti-shock padding 55 arranged in pre-formed shapes such that six "sockets" 50 are created for the receipt of light units. The padding 55 is arranged such that it rests, and possibly slightly presses, against all four sides of each light unit and the base of each light unit. If a lid is provided with the container, then the lid may also comprise padding 55 arranged to lie over the top of each light unit (when inserted in the sockets 50) to further prevent the light unit from being damaged due to shock, impact etc. when stored in the container.

The container also comprises electricity supply regulating means 60. This has a connection with each of the sockets 50 as will be described in more detail below.

An example of a portable battery operated light unit 70 is shown in FIG. 2. The unit 70 comprises a box shape housing 80, a base 85, a top 90 and a carrying handle 100 provided at the upper end of the housing 80. A lens 95 is provided in the top, through which the light generated by the unit is emitted.

The unit 70 also comprises an aerial 110 enabling communication between the unit 70 and a remote control means.

An underside view of the base 85 of a light unit 70 in FIG. 3 shows the connection means 120 through which electricity may be passed to recharge the battery provided inside the housing 80.

FIG. 4 shows the view looking directly down onto the top surface of the container 20. An array of six sockets 50 is visible. Each socket 50 is surrounded by padding 55. The sides 57 of each socket are also visible. At the base 58 of each socket 50, padding 55 is provided. Also, an electricity supply connection point 130 is provided through the padding 55 at the base 58 of each socket 50.

With a light unit 70 inserted into a socket 50 the electricity supply connection point 130 provided at the base 58 of the socket 50 connects to the connection means 120 provided on the base 85 of the light unit 70. This allows for charging of the battery inside the light unit 70.

The electricity supplied to each electricity supply connection point 130 and thus to each light unit 70 is regulated by the electricity supply regulation means 60 and thus connections between this regulation means and each electricity supply connection point 130 is provided (not shown).

The electricity regulation means 60 is also connected to a supply of electricity. As discussed herein, this supply could be from a mains network in a building, or a from a diesel/petrol generator. It is also possible for the supply to be provided from renewable means. In this regard, the renewable means could be solar or wind, although other sources are also contemplated such as ground heat, wave, sea current etc.

Figure 5:
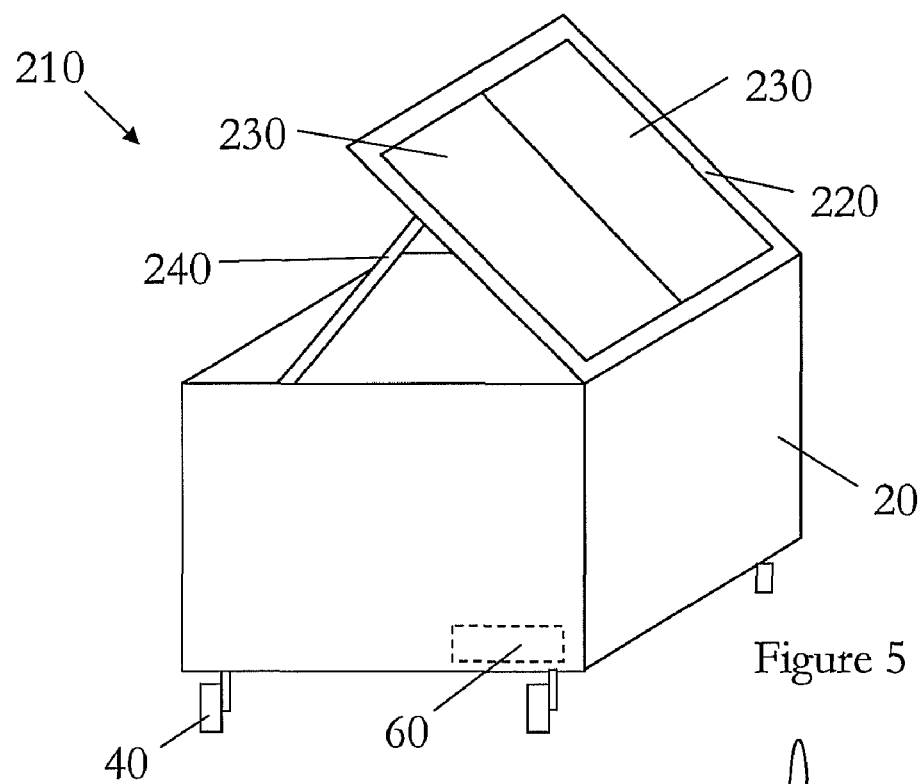
FIG. 5 is a perspective view of a different embodiment of the portable charging apparatus.

FIG. 5 shows an example where the apparatus 210 comprises a container 20 which is similar to the container 20 previously described with reference to FIGS. 1 and 4. However, this apparatus 210 also comprises a lid 220 for the container 20 which has two solar panels 230 provided on its outer surface. The lid 220 is hinged to the top of one side of the container 20. The apparatus 210 includes a lid support means 240 in the form of a ram the length of which may be adjustable to vary the angle of the lid 230 relative to the container 20. Together with the wheels 40 at the base of the container 20, this allows for the solar panels 230 to be directed towards the sun for optimum power generation. The panels 230 may be removable from the lid for storage within the container 20. The electricity regulation means 60 is also connected to the supply of electricity generated by the solar panels 230.

Figure 6:
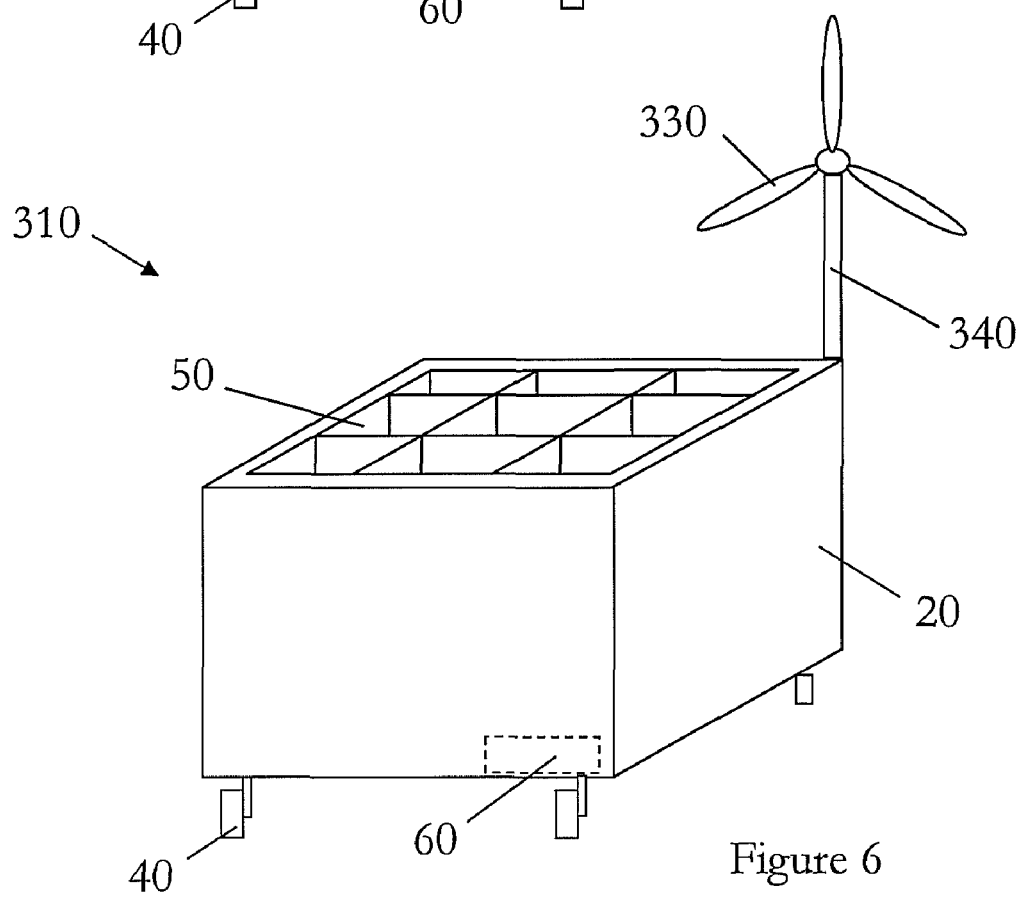
FIG. 6 is a perspective view of a light unit comprising a wind turbine for generating electricity to power the apparatus.

FIG. 6 shows an example where the apparatus 310 comprises a container 20 which is similar to the container 20 previously described with reference to the previous figures. However, this apparatus 310 comprises a wind turbine 330 supported on a column 340. The wind turbine 330 generates electricity which may be regulated by the electricity regulation means 60 provided within the container 20 in order to provide power to the apparatus 310 at least for the purpose of recharging the portable light units (not shown) when inserted into the sockets 50. The container 20 includes wheels 40 on its underside for ease of movement.

In the claims, means, or step-plus-function clauses, are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A portable charging apparatus for electrically charging batteries within one or more portable battery operated LED uplighters without the need to remove the batteries, comprising:
    a reinforced flight case having one or more receiving means for receiving one or more removable and portable battery operated LED uplighters;
    electricity supply connection means for electrically connecting with the one or more removable and portable battery operated LED uplighters, the electricity supply connection means being arranged such that, in use, each said portable battery operated LED uplighter is automatically electrically connected to an electricity supply when inserted into said receiving means, and automatically electrically disconnected from said electricity supply when removed from said receiving means, the apparatus further comprising an
    electricity supply regulating means including a transformer, and wherein the flight case includes wheels on its base, and impact absorbent material around each receiving means for substantially completely surrounding each of said portable battery operated LED uplighters, when received in said receiving means, in a close-fit for protecting them from mechanical shock, and wherein each receiving means includes orientation means to permit the insertion of the one or more LED uplighters in only one correct orientation relative to the apparatus.

2. The portable charging apparatus according to claim 1, wherein said electricity supply regulating means includes a rectifier and/or an inverter.

3. The portable charging apparatus according to claim 1, wherein said electricity supply regulating means is operable to supply electricity to said one or more portable battery operated LED uplighters at an appropriate voltage and current necessary for the recharging of said one or more portable battery operated LED uplighters.

4. The portable charging apparatus according to claim 1, wherein said apparatus includes an electricity generating means.

5. The portable charging apparatus according to claim 4, wherein said electricity generating means is a wind turbine.

6. The portable charging apparatus according to claim 4, wherein said electricity generating means is a solar panel.

7. The portable charging apparatus according to claim 6, wherein said flight case includes a lid comprising said solar panel.

8. A portable charging apparatus according to claim 1, in combination with one or more portable battery operated LED uplighter.

9. The portable charging apparatus according to claim 8, wherein said one or more portable battery operated LED uplighter includes electricity receiving connection means for allowing electricity to pass through said connection with said one or more portable battery operated LED uplighter.

10. The portable charging apparatus according to claim 9, wherein said electricity receiving connection means are provided on the base of each portable battery operated LED uplighter.

11. A method of charging a portable battery operated LED uplighter comprising the steps of:
    providing a portable charging apparatus according to claim 1; and
    inserting a portable battery operated LED uplighter into said receiving means such that said portable battery operated LED uplighter electrically connects with said portable charging apparatus.

12. The method of claim 11, wherein said portable charging apparatus includes an electricity generating means, said method further comprising the step of arranging said electricity generating means so as to supply electricity to said portable charging apparatus.

13. The method of claim 11, further comprising the step of regulating said electricity supply to allow for the recharging of said one or more portable battery operated LED uplighter.

14. The method of claim 12, wherein said electricity generating means is a wind turbine, and said method further comprises the step of erecting said wind turbine.

15. The method of claim 11, wherein said electricity generating means is a solar panel, and said method further comprises the step of erecting said solar panel.

* * * * *